March 29, 1955 R. C. INGWERSEN Re. 23,971

ELECTRIC CIRCUIT BREAKER

Original Filed May 24, 1952 2 Sheets-Sheet 1

INVENTOR.
Richard C. Ingwersen.
BY
Lawrence R. Beaman
ATTORNEY.

ELECTRIC CIRCUIT BREAKER

Original Filed May 24, 1952 2 Sheets-Sheet 2

INVENTOR.
Richard C. Ingwersen.
BY
Lawrence P. Bauman
ATTORNEY.

United States Patent Office

Re. 23,971
Reissued Mar. 29, 1955

23,971

ELECTRIC CIRCUIT BREAKER

Richard C. Ingwersen, Jackson, Mich., assignor to Mechanical Products, Inc., Jackson, Mich., a corporation of Michigan Original No. 2,665,347, dated January 5, 1954, Serial No. 289,742, May 24, 1952. Application for reissue October 11, 1954, Serial No. 461,704

3 Claims. (Cl. 200—116)

Matter enclosed in heavy brackets [ ] appears in the original patent but forms no part of this reissue specification; matter printed in italics indicates the additions made by reissue.

This invention relates to electric circuit breakers of the kind which comprise a hollow casing in which a thermal element adapted to be responsive to the heat of the conducted current is mounted for movement with respect to a relatively fixed abutment contained within the casing along with fixed and movable contacts corresponding to a circuit, the opening of which is effected automatically upon the occurrence of current of a predetermined value, due to the thermal element freeing itself from engagement with its abutment and releasing the movable contacts to move to open position.

In connection with circuit breakers of the above kind the split casing construction is required in order to permit the thermal element, contacts and associated parts to be assembled in operative position, but the problem arises how to maintain the casing construction as simple and inexpensive as possible yet provide that the casing shall be able to withstand the forces set up within the casing due to arcing when the circuit is suddenly broken upon the occurrence of the current overload. These forces are quite pronounced, as is appreciated by those skilled in the art, and are attendant with the evolvement of gases and flame due to the arcing condition mentioned. Also, in connection with these circuit breakers having oppositely disposed fixed and movable contacts enclosed within a casing, arcing occurs upon the circuit being suddenly broken at the contacts and gives rise to a flow of flame and gases in a magnetic loop-like path, from which it is desirable that the conductors carrying the fixed contacts, in particular, should be protected in order to avoid damage to the conductors by erosion.

It is an object of the invention to provide a circuit breaker of the above kind with an improved casing construction which has a baffling effect upon the arc to shield the fixed contact carrying conductors against the direct effect of the arc and in which, additionally, the thermal element is also protected against the direct action of the arc.

These, and other objects and advantages of the invention, residing in the construction, arrangement and combination of parts will be more clearly realized from a consideration of one practical form of the invention, by way of example, with reference to the accompanying drawings, in which.

Figure 1:
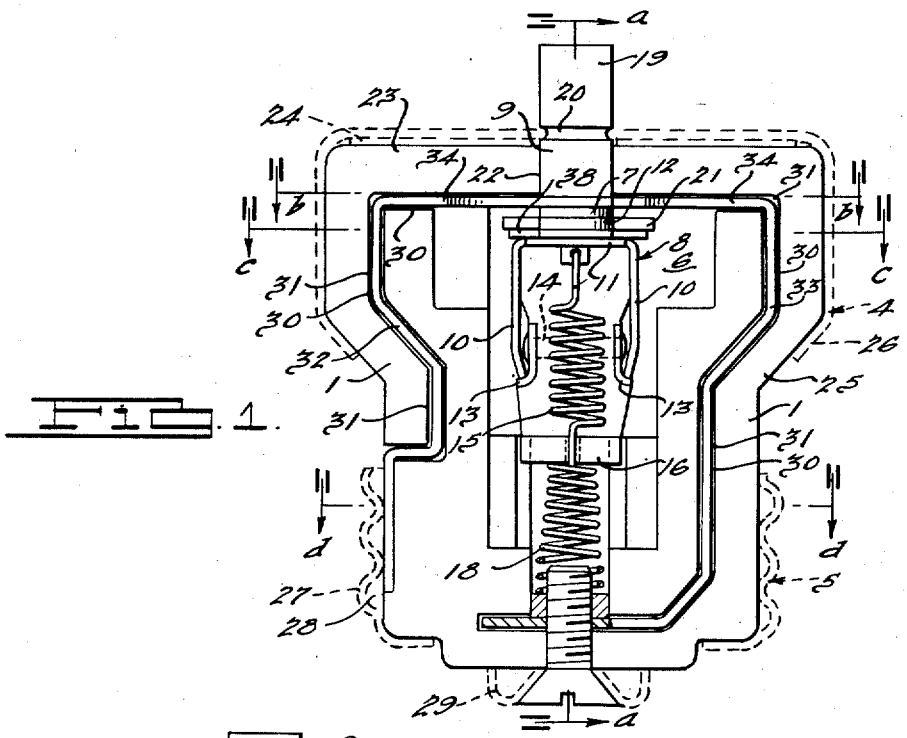
Fig. 1 is an elevational view looking upon the inside of one half of the casing of the circuit breaker according to the invention, with the other casing half removed but showing the thermal latch and actuator plunger in position and, in dotted lines, the position which the end caps and securing screw occupy in the assembled condition of the parts.

In the drawings, the casing construction is shown composed of two similar semi-cylindrical casing sections 1 and 2 of insulating material, which sections define a longitudinally extending split 3 in the casing and are held in assembled relationship by a pair of end caps, indicated generally at 4 and 5.

The casing sections combine to form an enclosed interior chamber 6, in which there are mounted a pair of diametrically spaced fixed contacts 7, and in which chamber there is also mounted a thermal latch and movable contact unit, indicated generally at 8, and an actuator plunger 9.

The unit 8 comprises a thermal latch assembly presenting oppositely disposed substantially U-shape bimetallic parts 10 united by integral bridge portions 11, upon which portions the movable contacts 12 are mounted for engagement with their companion fixed contacts 7.

The unit 8 is slidable relatively to the plunger 9, with the parts 10 located upon opposite sides of the plunger and adapted to have releasable latching engagement with abutment ledges 13 (Fig. 1) secured upon the plunger. These ledges are preferably provided by separate metal L-shape parts secured upon the plunger 9, as by a rivet 14. By providing the abutment ledges 13 upon separate metal parts, instead of directly upon the plunger, undue wear upon the plunger is avoided, it being appreciated that the plunger itself is formed from insulating material.

The unit 8 is held stressed into engagement with the abutment ledges 13 by the action of a pair of coil springs 15 connected between the bridge portions 11 and laterally protruding ears 16 at the inner end of the plunger. These springs are stressed when the unit 8 is moved relatively to the plunger 9 to engage the bimetallic latch parts 10 with their abutment ledges 13. It is to be noted that the parts 10 are electrically conductive. When the contacts 7 and 12 are closed, and the circuit breaker is in circuit, the current flow takes place between the contacts, in series along the limbs of the U-shape parts 10.

The plunger 9 is itself biased by a coil spring 18, which is compresed when the latch parts 10 are engaged with their abutment ledges 13, but acts immediately to project the end 19 of the plunger farther out of the corresponding casing end when the latch parts 10 are disengaged from the ledges 13. Such disengagement takes place automatically, due to the bi-metallic nature of the parts 10 and their distortion under the influence of the heat of the conducted current, and will occur when the current reaches a pre-determined value, corresponding to that for which the bimetallic parts 10 have been calibrated and which may be, for example, 15, 20, 25 or 30 amperes.

The plunger is provided with a band portion 20, which extends outside the casing when the plunger end 19 is projected, as stated, and, by being distinctively colored, for example, serves to give a visible indication that the circut has been broken.

Mounted upon the plunger there is a washer 21, which seals against the inside of the central opening 22 in the casing end wall 23 when the circuit is broken and serves to seal that opening against the escape therethrough of the attendant electrical arc and the evolved flame and gases. An additional seal is provided by a washer 24 retained between the casing end wall 23 and the end cap 4.

The sealing washer 24, by extending across and covering the upper ends of the split 3, serves to seal the casing interior against the escape of the aforesaid evolved arc gases and flame.

The end cap 4 is deformed at its inner end, as by spinning, to permanently embrace the casing shoulder 25, as indicated at 26.

The other end cap 5 is shown formed with a screw threaded skirt portion 27, screwed into position upon the corresponding screw threaded end portion 28 of the combined casing sections, and adapted for screwing into operative position with respect to a socket (not shown) containing the main electric supply terminals of the circuit to which the circuit breaker is required to be applied, and with which supply terminals electrical connection is maintained by a terminal end cap 29.

The casing sections 1 and 2, along their longitudinally opposed edge surfaces, are formed with complementary, elongated recesses 30, which define longitudinally extending channels 31 in which electrical conductor strips 32 and 33 are accommodated, the conductor 33 being in electrical conducting relationship to the terminal end cap 29, and the other conductor strip 32 being in electrical conducting relationship with respect to the screwed cap portion 27.

These conductor strips are fixed in position within the casing, and carry the fixed contacts 7. As appears clear in Fig. 1, in particular, the channels 31 are of tortuous form, and the conductor strips are correspondingly shaped. As a result, such portion of the evolved arc gases and flame as may seek to escape along these conductor strips within their respective channels will be constrained to follow a correspondingly tortuous path and thereby baffle their flow to the outside of the casing.

Figure 3:
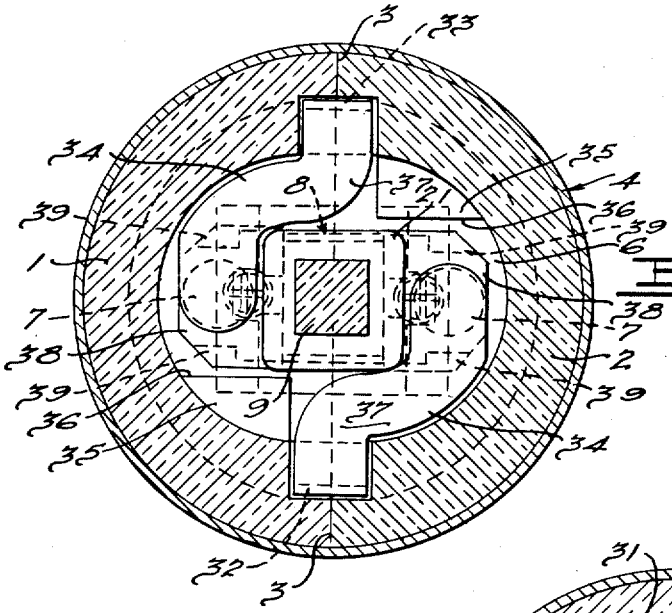
Fig. 3 is a transverse section on the line b—b of Fig. 1.
Figure 4:
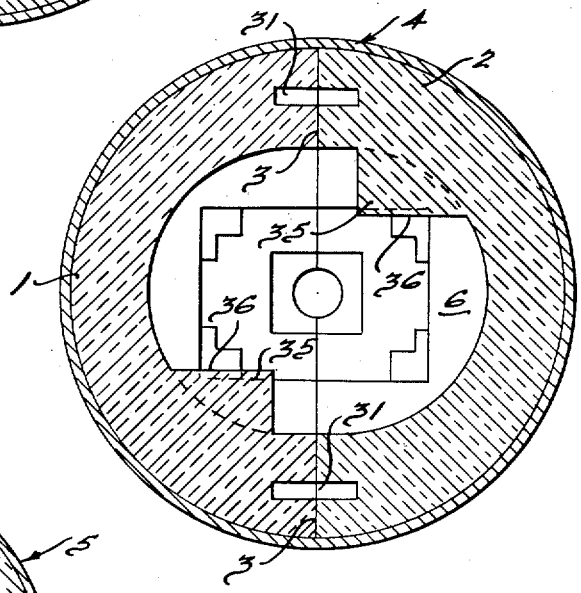
Figs. 4 and 5 are transverse sections on the line c—c and d—d of Fig. 1, with the thermal latch and associated parts removed.
Figure 5:
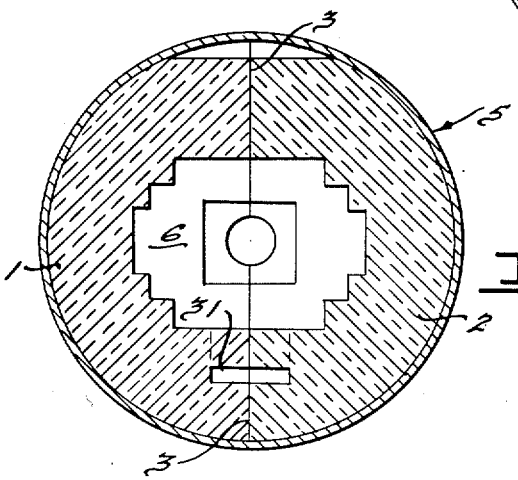

It is to be noted that the fixed contacts 7 are carried upon end portions 34 of the conductor strips which are bent inwardly in opposite directions into substantially arcuate form, as shown in Fig. 3, to dispose their fixed contacts 7 in diametrically spaced relationship and as remotely as possible from the casing split 3. It is also to be noted with respect to Figs. 3 and 4, in particular, that the casing interior is formed with inwardly projected wall portions 35 which present wall surfaces 36 in proximity to the curvedly bent portions 37 of the conductor strip portions 34. These casing wall portions 35 and their wall surfaces 36 are of particular importance and serve the purpose of protecting the portions 37 of the conductor strips from the direct effect of the arc which occurs when the circuit is suddenly interrupted at the contacts 7 and 12. In this connection, and as will be appreciated by those skilled in the art, this arc will tend to follow a substantially circular or magnetic loop-like path in which the conductor strip portions 37 are located. However, the wall surfaces 36 are also located in said path, immediately ahead of their respective conductor strip portions 37 and, accordingly, said wall surfaces serve as baffles to prevent the arc flame and gases from striking against the otherwise exposed conductor strip portions and causing erosion thereof. That this is so has been proven in practice, by observing the occurrence of "scorching" upon these wall surfaces upon arcing occurring. On the other hand, erosion occurred when the baffles were not present.

Protection from the direct effect of the arcing is provided with respect to the bimetallic latch portions 10 by fitting the bridge portions 11 with surface plates 38 having side portions 39 which overlie the upper ends of the latch portions 10, as seen in Fig. 3, in particular, and thus conceal the latch portions from the direct effect of such arcing, which, as concerns these latch portions, must first hit against the surface plates 38.

Figure 2:
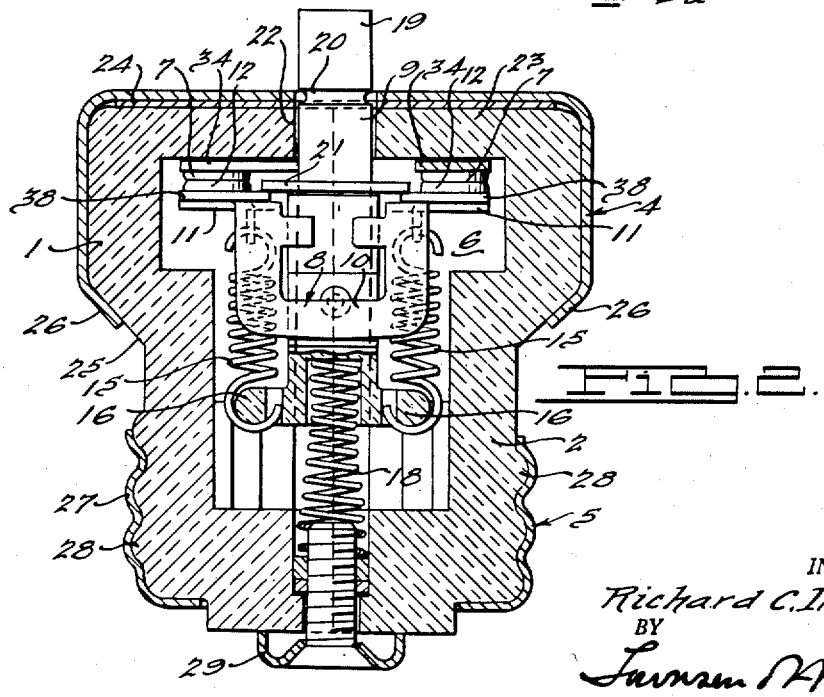
Fig. 2 is a longitudinal section of a circuit breaker and casing assembly according to Fig. 1 but with parts completely assembled and taken in a plane corresponding to the line a—a in Fig. 1, the contacts, thermal latch and plunger parts being shown in elevation.

In operation, with the parts as shown in Figs. 1 and 2, the circuit is closed at the contacts 7 and 12 and current can be conducted from the conductors 32 and 33, through the closed contacts and the series connected U-shape latch parts 10.

As the latch parts 10 become heated by the conducted current they will distort laterally outwards from their position of contact with their abutment ledges 13 and, in the event the over-load current value is reached, will distort to such extent that the latch parts disengage these ledges. When this happens the unit 8 will immediately move downwardly (as seen in Figs. 1 and 2) by the action of the coil springs 15 and cause the circuit to be broken suddenly at the contacts 7 and 12. The resulting arc will be dissipated within the casing by the combined action of the seals 21 and 24, the baffle walls 36, the surface plates 38 and tortuous channels 31, preventing bursting of the casing 1, 2 and the possibility of any exterior harmful effect. With the opening of the contacts the plunger 9 will immediately snap outwards by the action of its spring 18 and cause the indicator band 20 to be visibly positioned outside the casing wall 23.

To re-set the circuit breaker it is merely necessary to push the plunger 9 inwards to re-position the abutment ledges 13 with respect to the latch parts 10. Release of the plunger then allows the movable contacts 12 to re-engage their fixed contacts 7 with the latch parts also re-positioned for operation to break the circuit upon the re-occurrence of an overload.

Haivng thus described my invention what I claim as novel and wish to secure by letters Patent is as follows:

1. In an electric circuit breaker having current overload protection, casing structure defining a cylindrical interior space, a pair of fixed contacts disposed in said space in diametrically spaced relationship, conductor strips carrying said fixed contacts, said conductor strips including end portions enclosed in said casing and opposite end portions extending transversely into said space from diametrically opposite locations on said casing and exposed in said space, said opposite and exposed conductor end portions extending in oppositely directed bent relationship to their said casing locations and terminating in spaced relationship within said space on a diameter substantially perpendicular to said casing locations with said bent conductor portions substantially following the cylindrical contour of said space, said fixed contacts being carried at said terminating conductor ends, movable contact means mounted within said casing space, said movable contact means including spaced contacts positioned to engage with said fixed contacts and incorporating electrically conductive thermal latch means operable to hold said movable contact means closed with respect to said fixed contacts but automatically operable to free said movable contacts to move to open position upon the occurrence of current overload, said movable contact means bridging the space between said fixed contacts, and said fixed and movable contacts being so disposed, when closed, as to give rise to a substantially circular magnetic arcing path when the circuit is interrupted at said contacts, and arc baffle means within said casing space, said arc baffle means being located between the said transversely bent exposed conductor portions adjacent the said casing locations and the terminating ends of the conductors carrying said fixed contacts so that said baffle means lie within the said arcing path.

2. An electric circuit breaker as claimed in claim 1, said baffle means being constituted by wall portions on said casing projecting into and extending longitudinally of said space, said wall portions presenting wall surfaces located between the fixed contact on one said conductor and the portion of the other conductor where this conductor portion enters into the said space from a said location, said wall surfaces having a longitudinal extent greater than the longitudinal extent of the space occupied by said exposed conductor portions and the closed fixed and movable contacts.

*3. In an electric circuit breaker, hollow casing structure, fixed and movable contacts in said casing, bi-metallic latch structure in electrical conductive connection with said movable contacts, arc protective shield means on said latch structure, said movable contacts being mounted upon said shield means, said shield means being disposed between said movable contacts and said bi-metallic latch structure to cover the bi-metallic latch structure from the direct action of the arc flame and gas, conductor strips mounted upon said casing and having portions extending into said casing interior portion, said conductor portions carrying the fixed contacts, means sealing the casing against the escape of the evolved arc gases and flame, said bi-metallic latch assembly being responsive to the heat of the conducted current to automatically break the circuit at said contacts upon the current attaining a pre-determined value, and means for re-setting said latch assembly in position to close said contacts after actuation of the latch assembly to break said circuit.*

References Cited in the file of this patent or the original patent

UNITED STATES PATENTS

| | | |
|---|---|---|
| 2,378,648 | Maseng | June 19, 1945 |
| 2,385,727 | Platz | Sept. 15, 1945 |
| 2,459,629 | Dorfman et al. | Jan. 18, 1949 |
| 2,485,736 | Ingwersen | Oct. 25, 1949 |
| 2,506,796 | Krieger | May 9, 1950 |
| 2,627,037 | Morrissette | Jan. 27, 1953 |